(12) United States Patent
Jaramillo et al.

(10) Patent No.: US 7,690,676 B2
(45) Date of Patent: Apr. 6, 2010

(54) VEHICLE PILLAR TRIM PANEL ASSEMBLY

(75) Inventors: Jamison Jaramillo, Farmington Hills, MI (US); Erik Robins, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 379 days.

(21) Appl. No.: 11/675,322

(22) Filed: Feb. 15, 2007

(65) Prior Publication Data

US 2008/0197609 A1      Aug. 21, 2008

(51) Int. Cl.
*B60R 21/16* (2006.01)
(52) U.S. Cl. ............... 280/728.2; 280/728.3; 280/730.2
(58) Field of Classification Search ............. 280/728.3, 280/728.2, 730.2
See application file for complete search history.

(56) References Cited

U.S. PATENT DOCUMENTS

| | | | | |
|---|---|---|---|---|
| 5,709,407 | A * | 1/1998 | Stephens et al. ............. | 280/751 |
| 5,938,273 | A * | 8/1999 | Williams et al. ....... | 296/187.05 |
| 6,049,952 | A * | 4/2000 | Mihelich et al. .............. | 24/292 |
| 6,082,761 | A | 7/2000 | Kato et al. | |
| 6,145,908 | A * | 11/2000 | Deb et al. .................. | 296/39.1 |
| 6,199,907 | B1 * | 3/2001 | Mugford et al. ............. | 280/751 |
| 6,485,049 | B1 * | 11/2002 | Prottengeier et al. ...... | 280/730.2 |
| 6,705,636 | B2 * | 3/2004 | Takahara .................. | 280/728.2 |
| 6,719,321 | B2 * | 4/2004 | Yasuhara et al. .......... | 280/730.2 |
| 6,832,800 | B2 * | 12/2004 | Hwang ....................... | 296/39.1 |
| 6,848,711 | B2 | 2/2005 | Yamamura et al. | |
| 6,863,300 | B2 | 3/2005 | Ryu | |
| 6,883,828 | B2 * | 4/2005 | Ohki ........................ | 280/730.2 |
| 6,974,152 | B2 * | 12/2005 | Hanjono ................... | 280/728.3 |
| 7,017,942 | B2 * | 3/2006 | Elqadah et al. ........... | 280/730.2 |
| 7,083,212 | B2 | 8/2006 | Randazzo | |
| 7,114,744 | B2 * | 10/2006 | Sunabashiri .............. | 280/730.2 |
| 7,188,863 | B2 * | 3/2007 | Tiesler et al. ............. | 280/730.2 |
| 7,281,733 | B2 * | 10/2007 | Pieruch .................... | 280/728.2 |
| 7,390,016 | B2 * | 6/2008 | Noguchi et al. ........... | 280/730.2 |
| 2007/0222192 | A1 | 9/2007 | Yamagiwa et al. | |

* cited by examiner

*Primary Examiner*—Toan C To
(74) *Attorney, Agent, or Firm*—Young Basile

(57) ABSTRACT

A trim panel attachable to a structural pillar of an automotive vehicle for covering an expandable side-curtain air bag. The trim panel can also be part of a vehicular pillar structure or a vehicle subassembly. The trim panel is composed of a unitary molded body having first and second body portions connected to each other. The first body portion is formed of a first material and the second body portion is formed of a second polymeric material that is more flexible than the first material. The second body portion is configured as a deflectable flap movable between a first position in overlying relationship with the side-curtain airbag in a non-deployed state and a second deflected position upon deployment of the side-curtain airbag.

42 Claims, 11 Drawing Sheets

VEHICLE PILLAR TRIM PANEL ASSEMBLY

BACKGROUND

The present invention pertains to a vehicle subassembly for an automobile or other suitable motor vehicle. More particularly, the present invention pertains to motor vehicle pillar assemblies and to the associated trim panel or panels useful in regions such as the passenger compartment of the vehicle. The present invention pertains particularly to trim panels used in regions proximate to side curtain airbags.

Inflatable restraint devices commonly called airbags are standard equipment on most new vehicles. Initially, vehicles were equipped with airbags that would deploy from forward-facing regions such as the steering wheel and the passenger side of the instrument panel. As consumer's concerns for safety have increased, additional airbags have been employed in different areas of the vehicle. Side-curtain airbags have been proposed to compensate for the lack of a crush zone and energy dissipation capacity in the sides of vehicles. Side-curtain airbags have been employed or stored in areas of the roof rail and headliners or in the side doors. These airbag devices are typically concealed from occupant view by interior trim panels associated with the roof rod and/or headliner.

Interior trim panels concealing the airbag devices should be capable of permitting rapid egress of the airbag during the deployment event. The interior trim panels should also maintain aesthetic appeal during general vehicle operation. It is also desirable that these vehicle trim panels provide a measure of inherent crush protection in the event of a crash event.

These challenges are particularly accentuated in the design of trim panels such as those used on various structural pillars in an automotive vehicle. Such pillars can include, but are not limited to, A pillars, B pillars, C pillars, and the like. These pillars and the associated trim panels present the added challenges of limited space and as well as being located in positions proximate to the driver and passengers. Heretofore, side-curtain airbags have been deployed from trim panels located in the vehicle headliner proximate to the respective side of the vehicle. In order to enhance and promote deployment and protection in the event of a crash, certain vehicular body configurations could benefit from side-curtain airbag storage configurations and locations that use space defined between the respective auto body pillar and the trim panel. Given the desire to place accessory devices on the side pillar trim member, it would also be desirable to provide a trim panel member that could serve as a mounting for devices such as grip bars and the like while defining storage for at least a part of a side-curtain airbag.

SUMMARY

Disclosed herein is an automotive subassembly attachable to a vehicular pillar that includes a roof assembly, a pillar trim member, and an inflatable side-curtain airbag. The roof assembly can include and/or define a side-curtain airbag storage chamber configured to contain at least a portion of a side-curtain airbag. The pillar trim member is a unitary construction having an inner surface and an opposed outer surface. The pillar trim member covers at least a portion of the vehicular pillar structure to define an airbag storage area located between the inner surface of the pillar trim member and an outwardly-facing surface of the vehicular pillar structure. The inflatable side-curtain airbag in the automotive subassembly is configured to be coupled to the pillar structure and to be at least partially disposed in the airbag storage area defined between pillar structure and the pillar trim member and to be partially disposed in the roof assembly. The pillar trim panel is a unitary molded body that has first and second body portions with the second body portion being flexibly deformable relative to the first body portion upon deployment of the side curtain airbag to facilitate movement of the side-curtain airbag to the deployed position while the pillar trim panel remains attached to the associated vehicular pillar structure.

Also disclosed herein is a trim panel configured to be selectively attachable to a structure vehicular pillar for use in concealing at least a portion of an expandable airbag. The trim panel is a unitary molded body that includes a first body portion having an outer surface and an opposed inner surface. The first body portion is composed of a first material having a first modulus of elasticity. The second body portion is connected to the first body portion at a connection area. The second body portion is composed of a second material that has a second modulus of elasticity greater than the first modulus of elasticity. The first and second body portions cooperatively define an airbag storage chamber configured to conceal an expandable airbag in a stowed orientation. At least one region of the second body portion is operably deformable relative to the first body portion in response to deployment of the airbag to define a flexible airbag deployment aperture.

BRIEF DESCRIPTION OF THE DRAWINGS

The description herein makes reference to the accompanying drawings in which like reference numerals refer to like parts throughout the several views and wherein.

DETAILED DESCRIPTION

Disclosed herein is a trim panel configured to be selectively attachable to a structural vehicular pillar to contain and conceal an expandable airbag such as a side-curtain airbag. Also disclosed herein is a pillar assembly for a motor vehicle that can contain and conceal an expandable side-curtain airbag. Finally, also disclosed is as automotive subassembly that includes or is attachable to a vehicular pillar structure. The automotive subassembly contemplates a roof assembly together with a pillar trim member and an inflatable side-curtain airbag. The motor vehicle pillar assembly contemplates a pillar structure configured to extend between a vehicle body and a vehicle roof together with a pillar trim member and an inflatable side-curtain airbag coupled to the pillar structure. The side-curtain airbag is at least partially disposed in an airbag storage area defined by the pillar trim member and the vehicular pillar structure.

Figure 1:
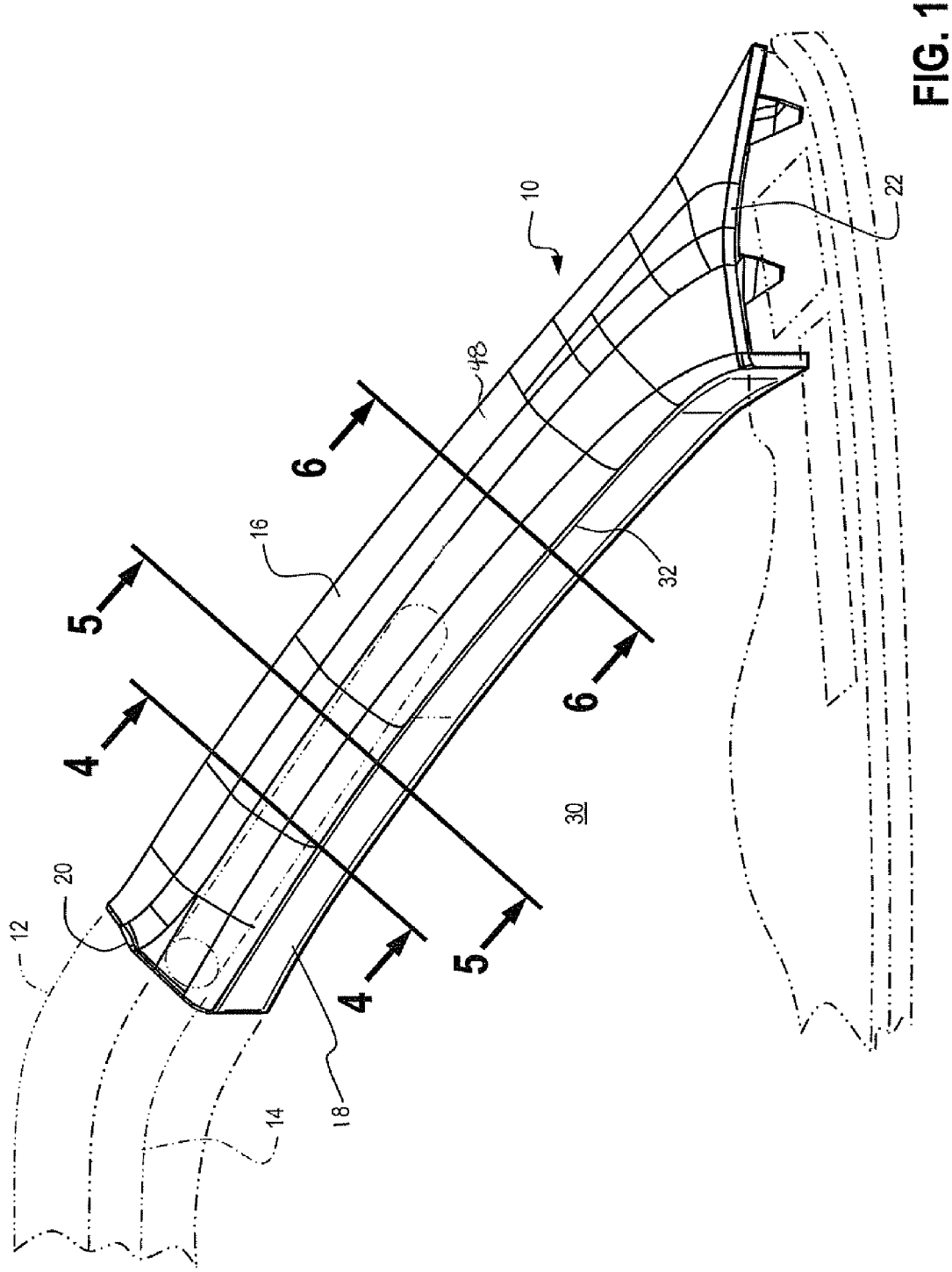
FIG. 1 is a front view of an embodiment of the pillar trim member as disclosed herein.
Figure 2:
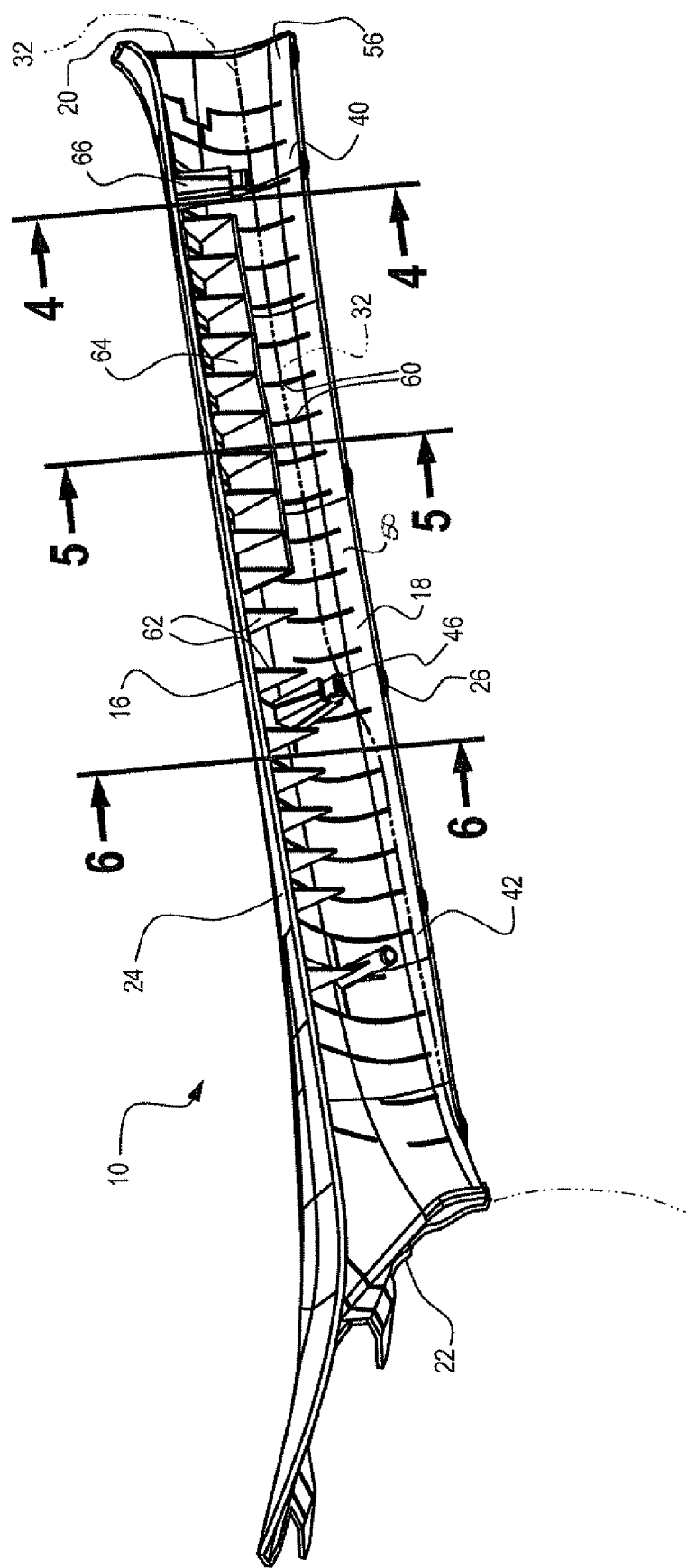
FIG. 2 is a rear view of the pillar trim member of the FIG. 1.
Figure 3:
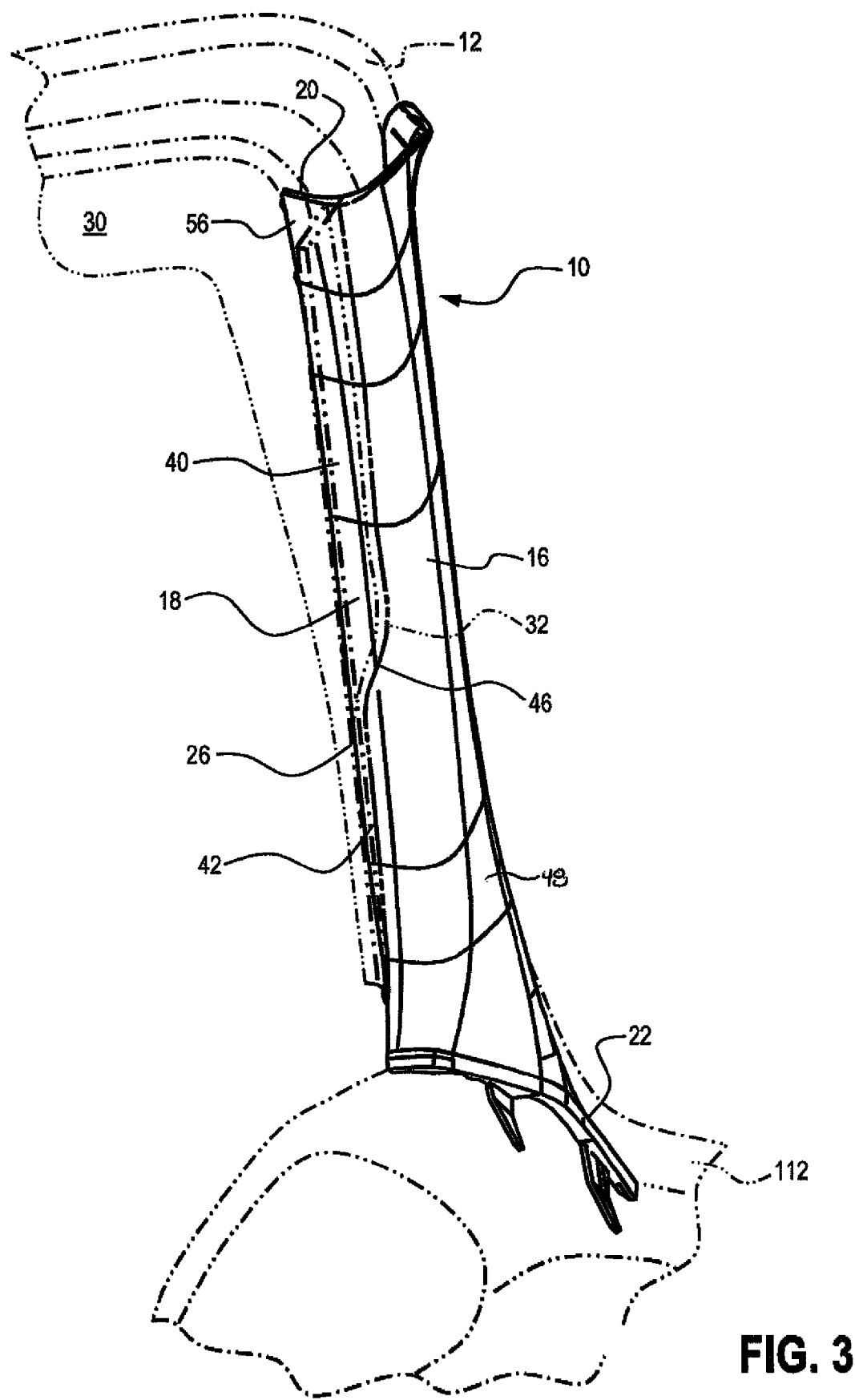
FIG. 3 is a side view a variation of the trim panel member of FIG. 1.

As depicted in FIGS. 1-3, trim panel member 10 is configured to be selectively attachable to an associated structural vehicular pillar such as pillar 12 to conceal at least a portion of an expandable airbag device 14. It is contemplated that the trim panel member 10 is configured in a manner that permits attachment to the pillar 12 in a manner that maintains the trim panel member 10 in engaged relationship to that pillar 12 during normal vehicle operation and lifespan but permits removal for access during scheduled service operations. The trim panel member 10 is configured to be attached to the associated pillar 12 in a manner that does not interfere with side-curtain airbag deployment during a crash event but will permit removal and replacement for routine servicing as desired or required.

The trim panel member 10 can have a unitary body structure that includes at least two body portions. The two body portions included in the trim panel member 10 include a first body portion 16 and a second body portion 18. The trim panel member 10 is at least partially defined by an upper edge 20, an opposed lower edge 22, a leading side edge 24, and an opposed trailing side edge 26. The trim panel member 10 is configured such that the upper edge 20 can be proximate to the roof region of the vehicle when the trim panel member 10 is in the installed condition. The leading side edge 24 is proximate to the forward portion of the passenger compartment when the trim panel member 10 is in the installed condition. The opposed trailing side edge 26 is configured to be proximate to a door window or side panel window such as window 30 when the trim panel 10 is in the installed position.

The first body portion 16 is composed of a material having a first modulus of elasticity. Where desired or required, the first body portion 16 may be composed of a first moldable polymeric material. Nonlimiting examples of such materials include various types of structural plastics such as engineered polymeric materials of which polypropylene is but one example. While it is contemplated that the first body portion 16 can be composed of a first moldable polymeric material, other suitable materials are also considered to be within the purview of this disclosure.

The second body portion 18 is connected to the first body portion 16 at a defined connection area 32. The second body portion 18 is composed of a second material different from the material employed in the first body portion 16. As disclosed herein, the second material is a moldable polymeric material having a second modulus of elasticity. The second modulus of elasticity is greater than the first modulus of elasticity of the material employed in the first body portion 16. Thus the second body portion 18 is deformable relative to the first body portion 16.

Figure 4:
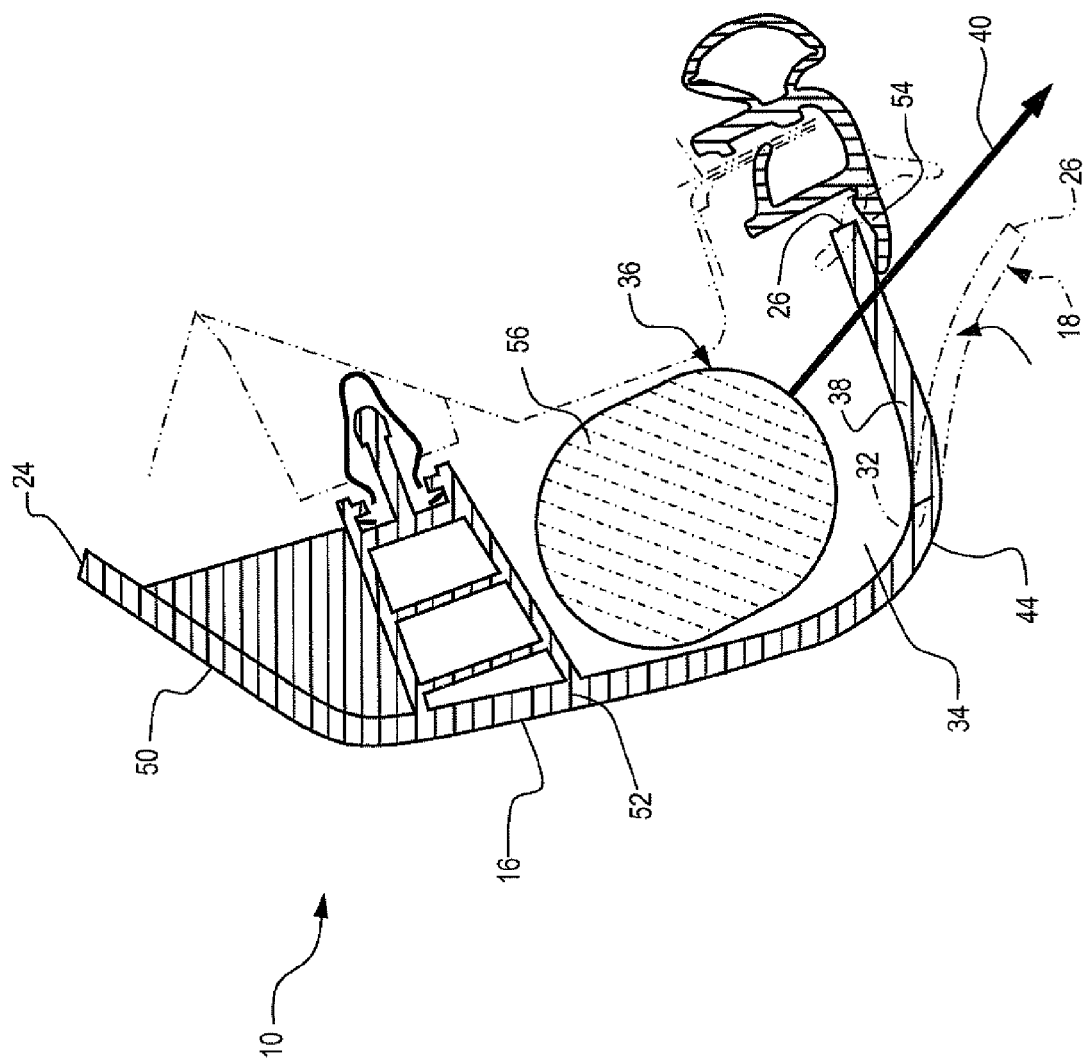
FIG. 4 is a sectional view through the 4-4 line of FIG. 1.
Figure 5:
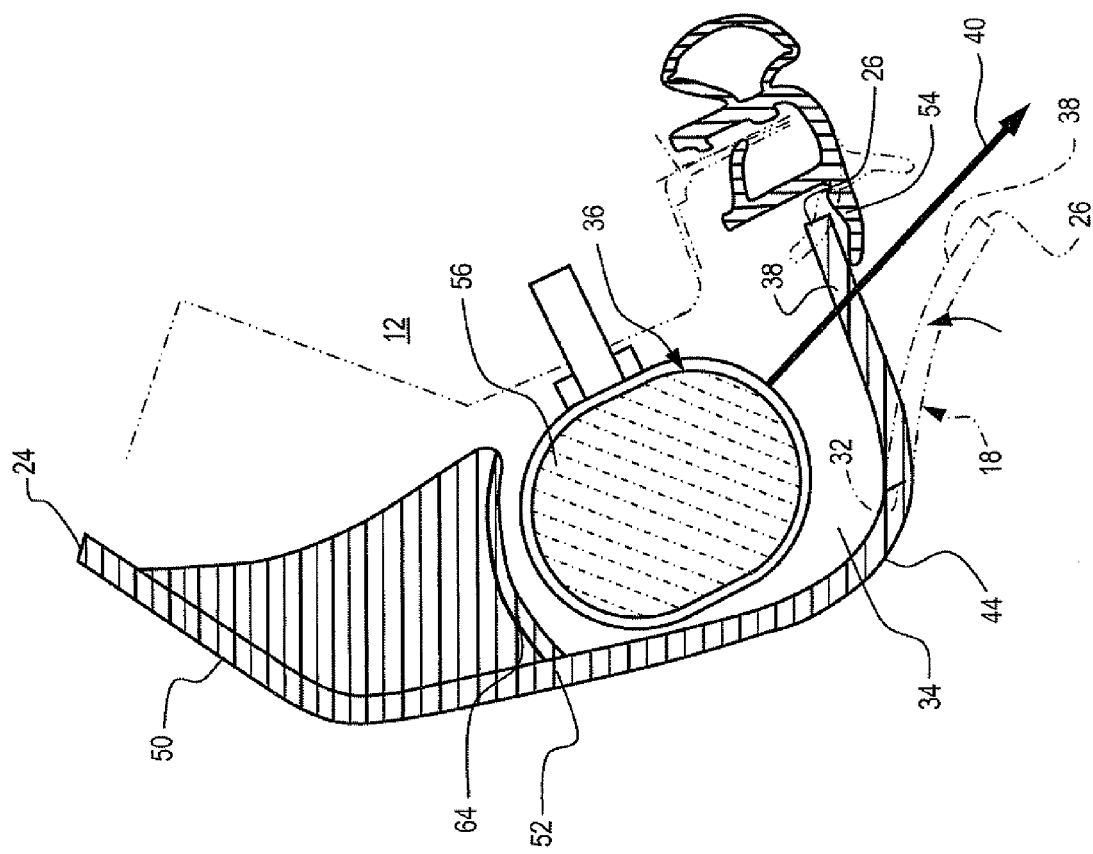
FIG. 5 is a sectional view through the 5-5 line of FIG. 1.

The first body portion 16 and the second body portion 18 cooperatively define an airbag storage chamber such as airbag storage chamber 34 (as depicted in FIGS. 4 and 5). The airbag storage chamber 34 is configured to conceal at least a portion of an expandable airbag such as side-curtain airbag 36 when it is in a stowed orientation.

Figure 6:
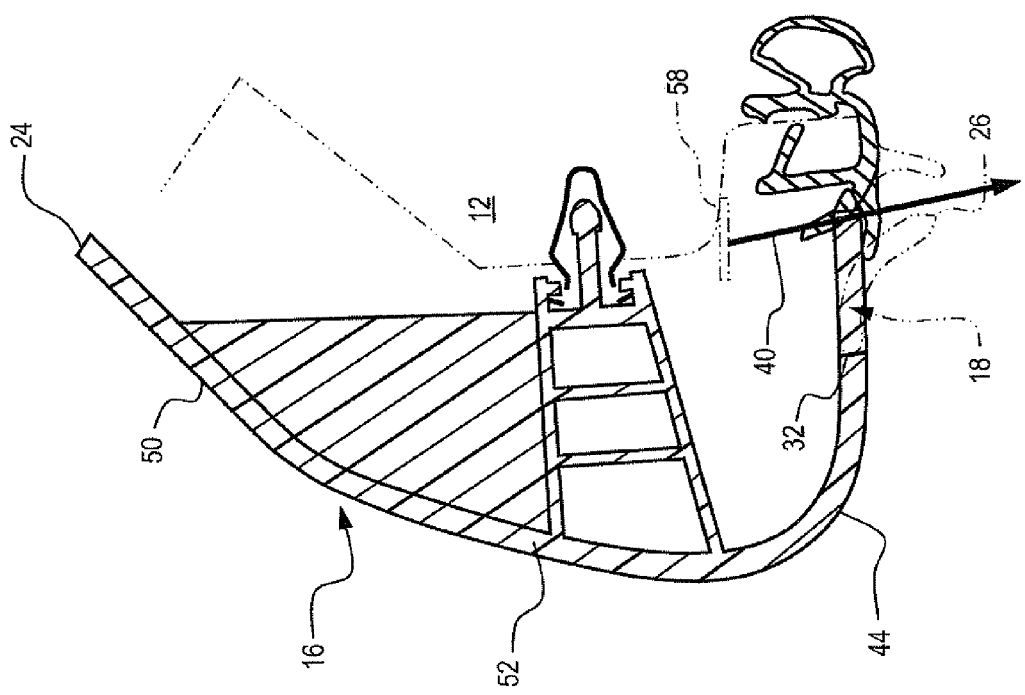
FIG. 6 is a sectional view through the 6-6 line of FIG. 1.

In the trim panel member 10, as disclosed herein, at least a region of the second body portion 18 is operably deformable relative to the first body portion 16 in response to deployment of the side-curtain airbag 36 to define a flexible airbag deployment flap 38 (as depicted in FIGS. 4 through 6). The flexible airbag deployment flap 38 is movable between a first closed position as depicted in solid line in the FIGS. 4 through 6 and a second position depicted in phantom. In the first position, the side curtain airbag 36 is in the stowed position and the second (or deployment enabled) position, deployment flap 38 is opened as the side-curtain airbag 36 expands to its deployed position. Movement of flap 38 from the closed position to the open position can be initiated by the deployment action of the side-curtain airbag 36. Upon deployment of the airbag 36 in a crash event, side-curtain airbag 36 expands outwardly in the direction of arrow 40 initiating deformable outward movement of the flap 38 to an outwardly extending position to define an aperture through which the airbag 36 expands.

In an embodiment of trim panel member 10 as depicted herein, it is contemplated that the second body portion 18 can flexibly deform along its entire cross-sectional area from the trailing side edge 26 to the point of connection 32 while remaining connected to the first body portion 16. Where desired or required, it is contemplated that the second body portion 18 defining flap 38 can deformably contour in response to the deployment and contours of the side-curtain airbag 36 as deployed.

The second body portion 18 can be composed of a moldable polymeric material that has a second modulus of elasticity greater than the modulus of elasticity of the first body portion 16. As defined herein, the term "modulus of elasticity" is defined as a substance's tendency to be deformed when a force is applied to it. Suitable materials can be those that can be configured onto the flap configuration and can deform in the outwardly oriented manner described above upon deployment of the side-curtain airbag 36. Non-limiting examples of materials suitable for use in the second body portion 18 include any of a variety of moldable polymeric compositions capable of suitable adhesion to the material or materials employed in the first body portion 16. These can include various thermoplastic elastomers such as moldable Santoprenes and the like. One non-limiting example of suitable polymeric materials for use in the second body portion 18 can be polyolefin-based thermoplastic elastomers having a shore A durometer between about 50 and 80. A nonlimiting example of such material is commercially available from A Schulman Corporation under the trade name Invision. Other nonlimiting examples of suitable materials can include EDPM, PVC, and the like.

It is contemplated that materials suitable for use in the second body portion 18 are those capable of being connected to the first body portion 16 in a two-shot injection molding process. It is contemplated that suitable materials will be those that exhibit appropriate bond strength to the first body portion and possess appropriate ultraviolet stability that meets or exceeds the ultraviolet stability of other interior components. The resulting trim panel member will exhibit structural stability and will retain dimensional stability within a range of −40° C. to 80° C.

Where desired or required, the trim panel member 10 has first body portion 16 that extends from the upper edge 20 to the lower edge 22 and defines the leading side edge 24. The second body portion 18 is positioned proximate to the upper edge 20 of the trim panel member 10 and defines at least a portion of the trailing side edge 26. The first and second body portions 16, 18 can be configured relative to one another in any manner that defines the deployment flap 38. In the embodiment depicted in FIG. 1, the connection area 32 is defined as an essentially straight line between first body portion 16 and second body portion 18 extending from the upper edge 20 and the lower edge 22. In the variation depicted in FIGS. 2 and 3, the connection area 32 includes at least one curved region 46 that will be described in greater detail subsequently.

In many instances, at least a portion of the side-curtain airbag 36 employed is configured to be mounted at or near the roof region of the associated vehicle and to deploy from that location through both the headliner and the trim panel. In certain instances effective deployment of the side-curtain airbag 36 is enhanced by the use of a tether that connects what will be a lower portion of the side curtain airbag 36 during and after deployment with the associated pillar 12. The tether is in (or housed by) a region defined by the pillar trim panel member 10 and the pillar 12 prior to deployment.

In the embodiment as set forth in FIGS. 1 and 2 more particularly the variation depicted in FIGS. 2 and 3, the second body portion 18 includes an upper region 40 and a lower tail region 42 contiguously connected to the upper region 40. The width of the upper region 40 is greater than the width of the tail region 42 with the configuration of the first body region 16 being configured complimentary thereto. In the embodiment depicted in FIGS. 3, tail region 42 is connected first body portion 16 in a manner such that tail region 42 tapers to a lower edge at a point prior to lower edge 22. Thus the lowermost portion of the trailing side edge 26 of trim panel 18 is defined by first body portion 16.

Where the second body region 18 has such dual configuration, it is contemplated that the length of upper region 40 may correspond roughly to the location of the side-curtain airbag storage chamber 34 defined by the trim panel member 10. The lower region 42 is configured to correspond to the position of the side-curtain airbag tether connected between the airbag 36 and to the associated vehicle pillar 12 to orient the airbag during and immediately after deployment. Where desired or required, the lowermost portion of the lower region 42 corresponds to the point of tether attachment when the pillar trim panel member is in the mounted position. It is to be understood that the configurations depicted in the drawing figures, particularly in FIGS. 1-3 is to be considered as exemplary of the configurations contemplated in the present disclosure.

The pillar trim panel member will have a junction or connection area 32 proximate to the junction between the first body portion 16 and the second body portion 18. It is contemplated that the connection area 32 between the first body portion 16 and the second body portion 18 can be located at a position on the trim panel 10 substantially defines the airbag storage area 34. In the embodiments depicted in the drawing figures, the first body portion 16 is configured in a manner that that permits the major portion of airbag storage area 34 to be defined by the first body portion 16. As depicted in the embodiment of FIGS. 1-6, the connection area 32 is positioned proximate to a trailing cross-sectional arc 44 defined in the trim panel member 10.

Thus, the upper region 40 of second body portion 18 defines deformable flap 38 that is movable between a first closed position and a second open position in an outwardly oriented direction. Where desired or required, it is contemplated that deformation can be initiated at an uppermost location of the trailing side edge 26 and can progress downward and inward from there. During and after deployment, it is contemplated that the second body portion 18 will remain connected to the first body portion 16 in the connection area 32 proximate to the arc 44.

Figure 7:
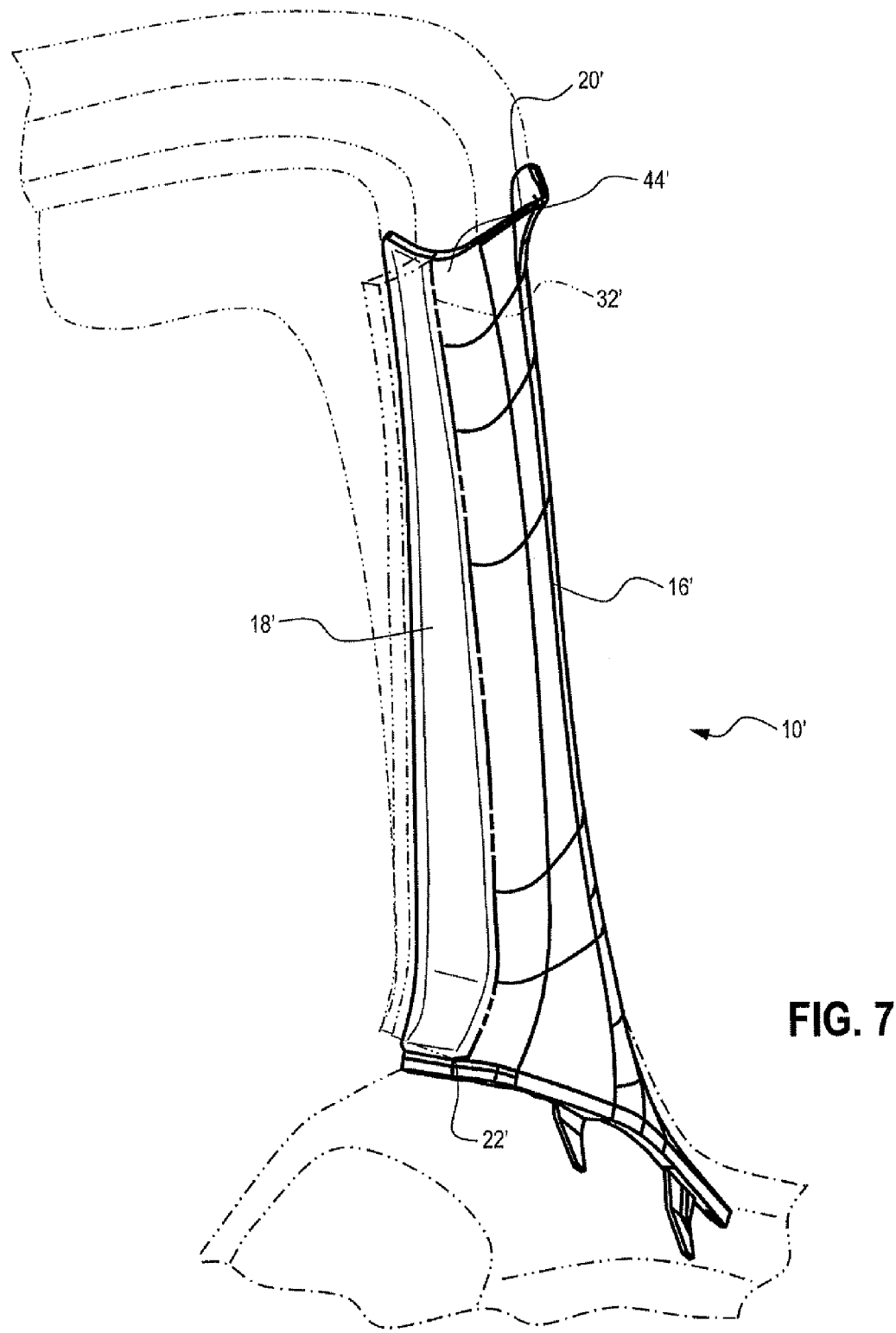
FIG. 7 is an alternate embodiment of the trim panel member disclosed herein.
Figure 8:
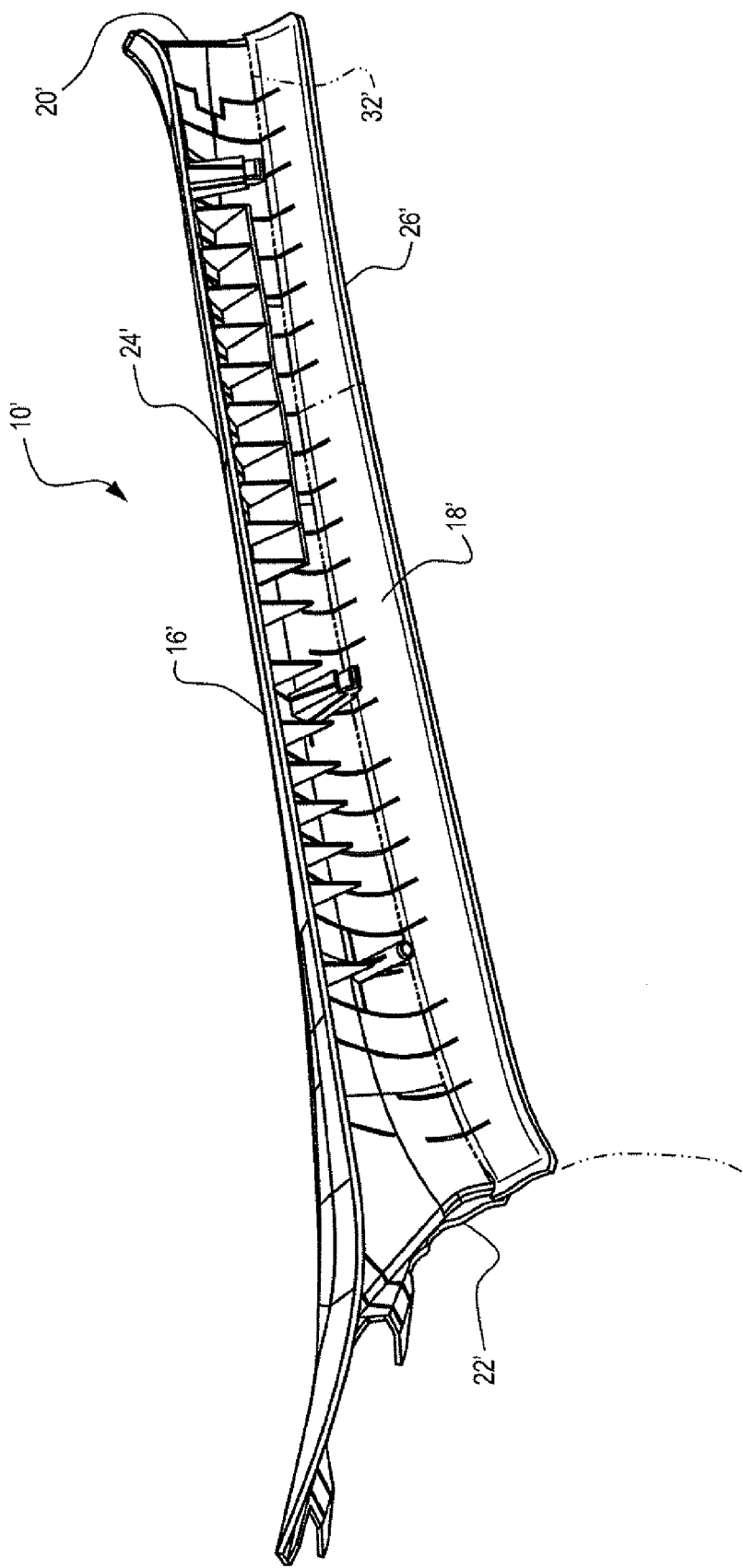
FIG. 8 is a rear view of FIG. 7.

Alternate configurations of the second body portion 18 are considered within the purview of this disclosure. One nonlimiting embodiment of the trim panel member is depicted in FIGS. 7 and 8 in which the second body portion 18' extends from the upper edge 20' to the lower edge 22' with a slight flair but with little or no side-to-side contour in the connection area 32'.

Figure 9:
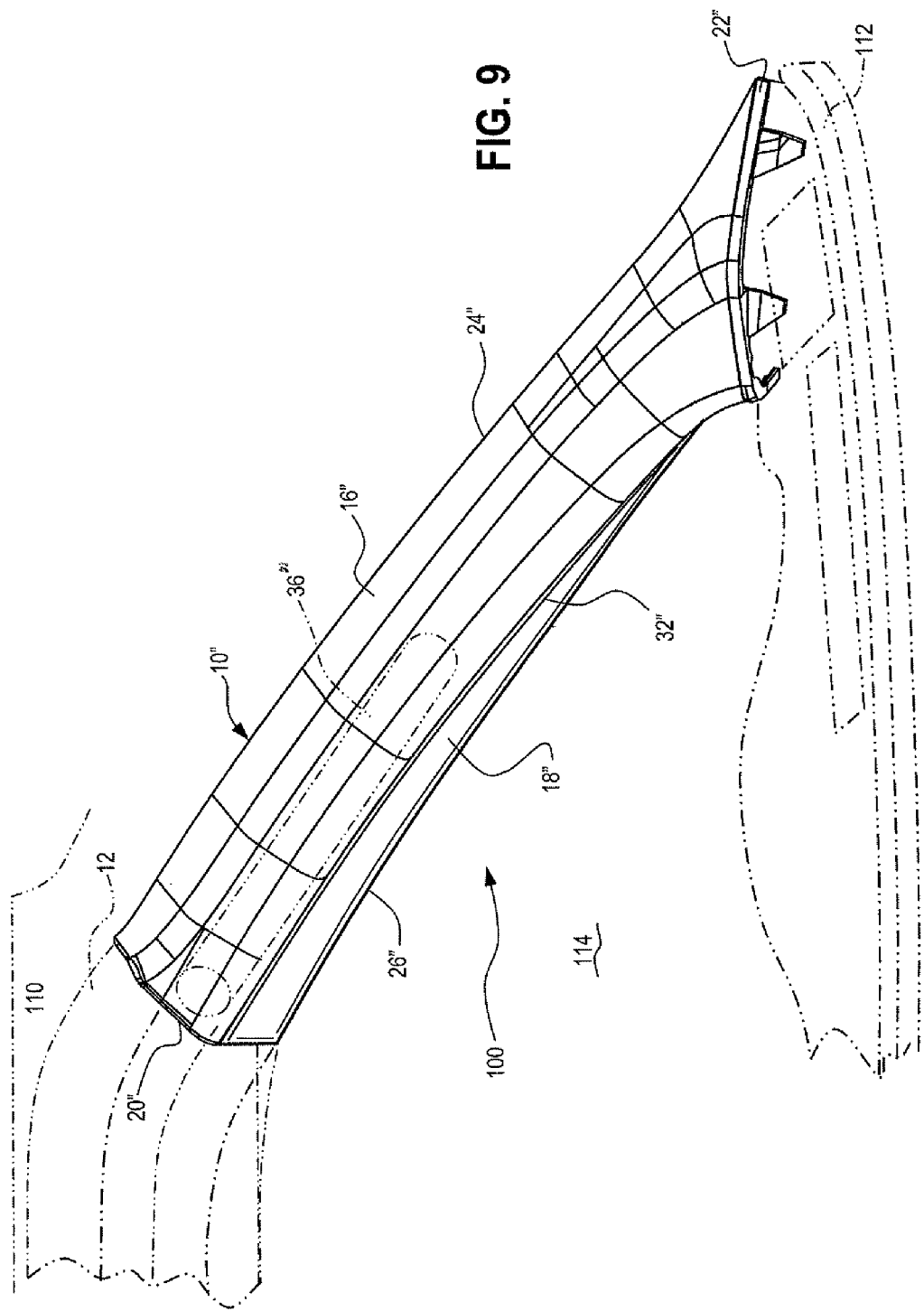
FIG. 9 is an embodiment of an automobile subassembly as disclosed herein.

Another nonlimiting example of an alternate embodiment of the trim panel member is depicted in FIG. 9, in which trim panel member 10" includes a first body portion 16" and a second body portion 18", in which the second body portion 18" is characterized by a continuing taper that terminated at or before the lower edge 22". Where the second body portion 18" terminates before the lower edge 22", it is contemplated that the second body portion 18" will terminate at a point that corresponds with or is below the point at which the airbag tether 58 is attached or attaches to the pillar 12.

The relative dimensions of the first body portion 16 and the second body portion 18 can be such that the first body portion is configured to conceal a major portion of side-curtain airbag 36 when it is in the stowed orientation. In the embodiments depicted herein, the first body portion 16 is configured to cover the leading surface of the associated pillar 12 as well as overlying the interior-facing surface of the pillar in a manner such that a portion of side-curtain airbag 36 can be positioned there within. Thus, the trim panel member 10 can have a leading surface 50 proximate to the leading side edge 24. The trim panel member 10 also includes an intermediate surface 52 that includes arcuate region 44 at its trailing end. It is contemplated that the intermediate surface 52, in combination with the arcuate region 44, defines the major portion of the airbag storage chamber 34. The second body portion 18 defines the corresponding minor portion of the airbag storage chamber 34 and provides the egress route for side-curtain airbag 36 upon airbag deployment.

The trailing edge 26 of the second body portion 18 may be configured in any suitable manner. It is contemplated that the trailing edge 26 of second body portion 18 can be configured to have an edge adapted to engage a corresponding portion of the vehicular body. In the embodiment depicted in FIGS. 4-6, the trailing edge 26 engages movable flap 54. Other suitable engagements or contact arrangements are also considered with in the purview of this disclosure.

The second body portion 18 is configured to be selectively deformable relative to the trim panel member 10 in response to deployment of the side-curtain airbag 36. It is contemplated that selective deformability of the second body portion 18 facilitates transition of the airbag to a deployed configuration. During deployment, it is contemplated that the second body portion 18 flexibly deforms from an initial point located proximate to the upper edge 20 of the trim panel member 10 sequentially downward as the airbag deploys. Deformation of the second body portion 18 in the form of flap 38 is triggered by the expansion of airbag 36. Without being bound to any theory, it is believed that the deformation of second body portion 18 assists in directing and orienting the airbag through the deployment event. As the airbag deploys, progressively lower regions of the second body portion 18 deform sequential to the initial region, thus permitting the airbag 36 to expand.

Where desired or required, the side-curtain airbag 36 can include inflatable portion 56 that is at least partially housed in the trim panel member storage area 34 with the remainder of the airbag 36 housed in suitable compartments defined in areas such as the roof trim region adjacent to the upper edge 20 of the trim panel member 10.

The side-curtain airbag can have any suitable configuration and construction. It is contemplated that the side-curtain airbag 36 will include a forward portion oriented towards the front of the associated vehicle when deployed. Side-curtain airbag 36 also includes a tether 58 anchoring the deployed side-curtain airbag to the pillar 12 during and after deployment. Tether 58 includes a first end mounted or connected to the forward edge of the expandable portion 56 of airbag 36. A second end can be permanently mounted to the vehicle pillar 12 in a manner that permits deployment of the airbag into the expanded curtain position while maintaining the leading edge of the deployed airbag in position relative to the associated pillar 12. It is contemplated that the intermediate portion of the tether 58 can exit through the lower portion 42 of the second body portion 18. It is also contemplated that an embodiment of the trim panel member 10 can facilitate a ripcord like deployment of the airbag from the interior defined by the trim panel member 10. Thus, the deployment event can begin with the egress of the side-curtain airbag 36 from the trim panel member 10 in the upper region of second body portion 18 proximate to upper edge 20 and proceed sequentially downward with the intermediate portion of tether 58 exiting in a ripcord-like fashion along the lower region 42 of the second member 18. Because the first body portion 16 is constructed of a more rigid material, the structure of the trim panel member 10, when mounted to the associated vehicular pillar 12 can provide directional support for the deploying airbag 36.

The first body portion 16 and second body portion 18 of trim panel member 10 can be formed by any suitable process. As disclosed herein, it is contemplated that the trim panel member 10 can be a unitary body formed by a suitable two-shot injection molding procedure. The connection area 32 between the first body portion 16 and the second body portion 18 can be an injection-molded bond between mating surfaces of the two respective body portions. The connection between the first body portion 16 and the second body portion 18 can be in any suitable form that will provide appropriate contact and connection between the two respective portions. By appropriate contact and connection, it is contemplated that the connection be sufficiently strong so as to maintain the second body portion 18 in connected contact with the first body portion 16 during and after an airbag deployment event.

Figure 10:
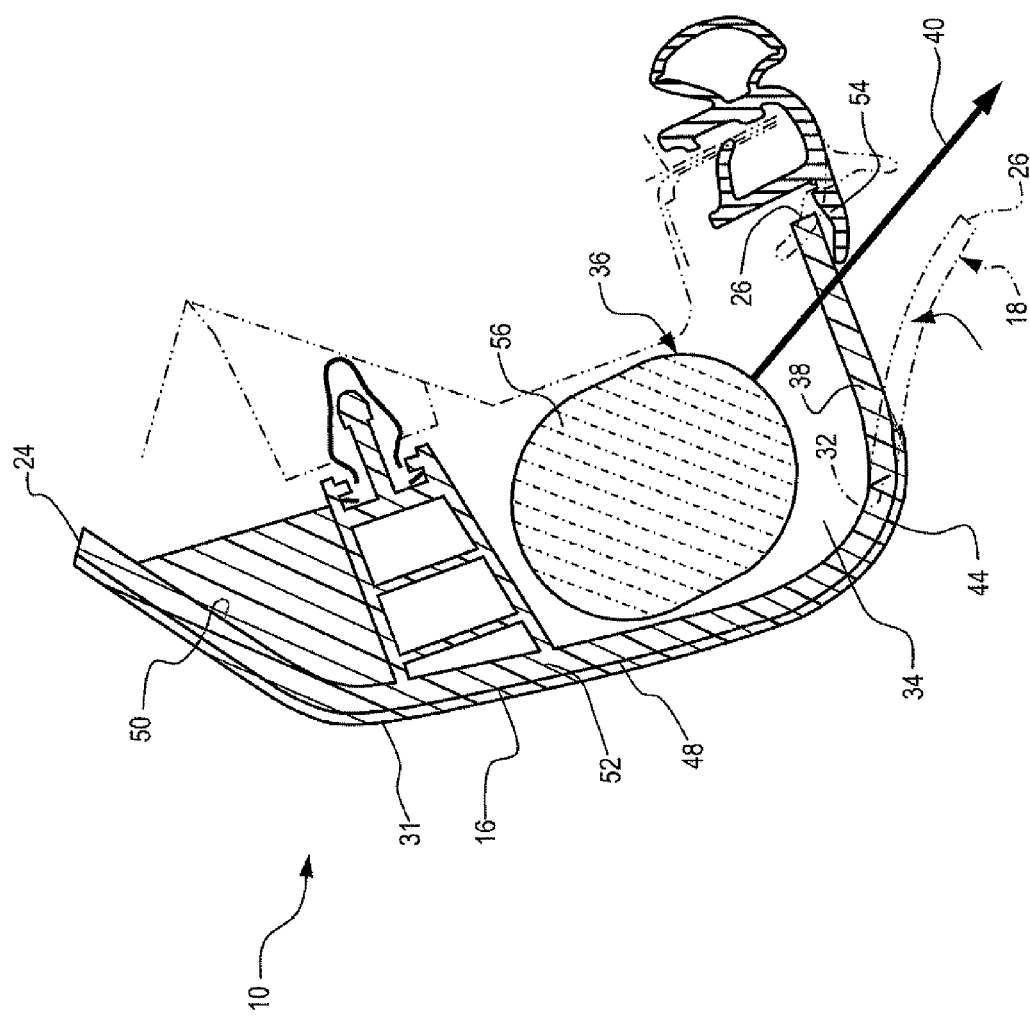
FIG. 10 is a cross sectional view of an alternate embodiment of the trim panel member disclosed herein depicting a overlying layer.

The connection between the first body portion 16 and the second body portion 18 can have any suitable configuration of which butt joint connections, overlap butt joint connections, and overlapping connections are but three nonlimiting examples. The term "butt joint" connection is taken to include any of a number of side-to-side connections between the two body portions 16, 18. The term "overlap butt joint" connection is taken to include connections having stepped features at the point of connection, while an "overlap connection" is taken to include various configurations in which one body portion extends in an overlapping relationship in contact with the respective surface of the other body portion.

Where desired or required, the second body portion 18 composed of the more flexible polymeric material can be configured to include a projection to overlap at least a portion of the outer surface 48 corresponding to the first body portion 16 to provide a continuous skin that is contiguously with the body portion 18. One non-limiting example of such a configuration is depicted in FIG. 10 in which extension 31 is configured as a film or layer that overlies at least a portion of the first body portion 16 and is attached to the first body portion 16 by suitable means. It is contemplated that the attachment can be accomplished by means of a suitable bonding mechanism either direct between the two surfaces or by means of at least one suitable adhesive layer (not shown). Where desired or required, it is contemplated that the configuration can be achieved by a suitable two-shot or two-step injection molding process.

Figure 11:
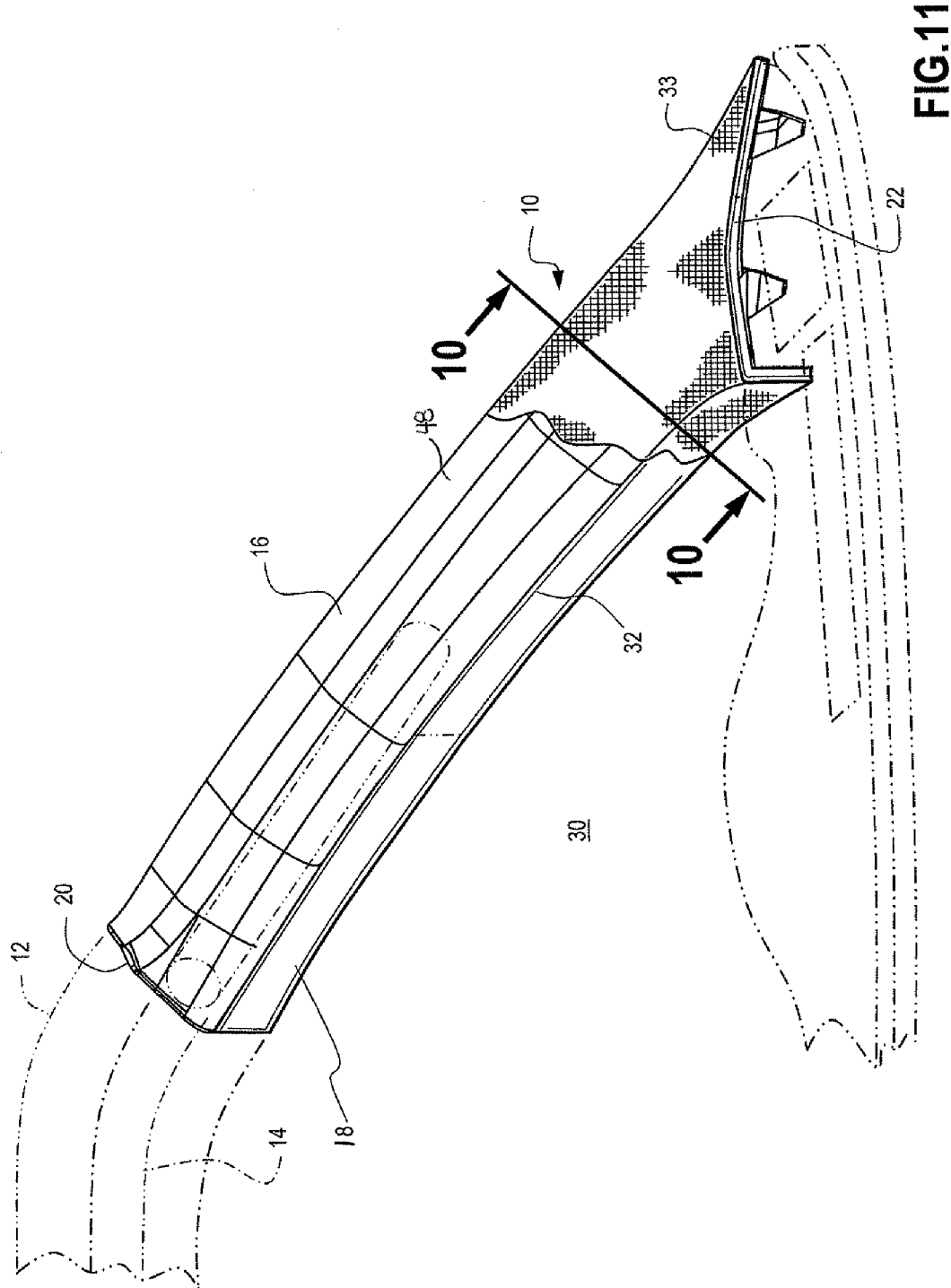
FIG. 11 is a perspective view of an alternate embodiment of the trim panel member disclosed herein depicting an overlying cover layer partially removed for purposes of illustration.

It is also contemplated that the connection area 32 can be reinforced by other mechanisms including, but not limited to, at least one distinct overlaying layer in overlying relationship with the outer surface 48 of the trim panel member 10. One non-limiting example of this is depicted in FIG. 11. It is contemplated that layer 33 can overly at least one of the first body portion 16 and the second body portion 18. Layer 33 can be attached or affixed to the trim panel member 10 by any suitable means. Non-limiting examples of materials suitable for use in layer 33 include polymeric film, woven material, and the like. It is contemplated that such materials can be applied during the molding process or applied in any suitable post-molding procedure. The polymeric film or woven material sheet can be made of materials that conform or coordinate with the colors and/or textures employed in the vehicle interior.

It is also contemplated that the outwardly-facing surface 48 of the trim panel member 10 can have an appropriate texture and/or color to coordinate with the textures and/or colors of employed in the vehicle interior (not shown). Non-limiting examples of such textures include stippling, grain effects, and the like. The first body portion 16 and second body portion 18 can have appropriate color and texture matches such that the overall effect of the trim panel 10 is unified and aesthetically pleasing.

Where desired or required, it is contemplated that the connection area 32 between first body portion 16 and second body portion 18 can include suitable reinforcement members. Nonlimiting examples of such reinforcement members include connection reinforcement projections 60 that are integrally molded in one body portion and projecting a distance into contact with the corresponding other member. Thus in the embodiment as disclosed herein, it is contemplated that the first body portion 16 can be configured with at least one reinforcement projection 60 that that extends a distance from the first body portion 16 into contact with the second body portion 18 in the region of the connection area 32. As depicted in the embodiment in FIG. 2, the panel member 10 includes a plurality of reinforcement projection(s) 60 configured as a series of ribs positioned at a spaced distance along at least a portion of the interior surface 50 of trim panel member 10. The ribs contact and are bonded to the portion of the interior surface 50 of the trim panel member 10 that correspond with the second body member 18 to provide reinforcement when the trim panel member 10 is in the use position. In the embodiment disclosed herein, it is contemplated the reinforcement connection projection(s) 60 may be molded integral to the respective body panel. Alternately, the reinforcement connection projection(s) 60 may be separately formed and attached or affixed by suitable attachment mechanisms.

The connection reinforcement projection(s) 60 can be configured and spaced as desired or required. Where desired or required, such projections can be configured and constructed so as to be frangible upon deformation of the second body portion 18 in an airbag deployment event. Without being bound to any theory, it is believed that the breakage of the connection reinforcement projection(s) 60 upon an airbag deployment event will absorb deployment energy to help maintain the connection area 32 between the first body portion 16 and the second body portion 18.

The trim panel member 10 may also include additional structural reinforcement member(s) 62 projecting outwardly from the first body portion 16. As depicted in the embodiment in FIGS. 1 through 3, and best seen in FIGS. 2 and 8, the reinforcement member(s) 62 are a series of projecting fins extending from the first body portion 16 at a position corresponding to the interior surface 50. The reinforcement member(s) 62 extend from the trim panel 10 to a terminal location. As depicted, the reinforcement members 62 are configured to abut the associated vehicular pillar 12 when the trim panel member 10 is in the use position. In addition to reinforcement, it is contemplated that the reinforcement members 62 may provide orientation and stability for the trim panel member 10 in the installed position. The reinforcement members 62 can be of varying configuration as desired or required. In an embodiment as depicted herein, the plurality of reinforcement members 62 increase progressively in size from the region proximate to the upper edge 20 to the region proximate to the lower edge 22

Where desired or required, the trim panel member 10 can also include at least one airbag deflector 64 connected to the first body portion 16 and located in a region proximate to the location of the airbag 36 when the trim panel member 10 is in the use position. The airbag deflector 64 can have any configuration suitable to maintain the airbag in the stowed position and/or direct deployment of the airbag in the event of a crash event. As depicted in the embodiment in FIG. 2, the airbag deflector 64 is integrally molded with the first body portion 16 and with a plurality of reinforcement members 62. Other configurations are to be considered within the purview of this disclosure.

The trim panel member 10 as disclosed herein also includes at least one attachment mechanism 66 connected to the interior surface 50 of the first body portion 16 and projecting outward therefrom. The attachment mechanism 66 can have a configuration suitable to mount to and engage with appropriate mating surfaces associated vehicular pillar 12 in an essentially permanent manner (not shown). As used herein, the term 'essentially permanent manner' is taken to mean that engagement between the trim panel member 10 and the associated vehicular pillar 12 will be one that will withstand an airbag deployment event. Thus, in the event of deployment of side curtain airbag 36, the trim panel 10 will remain attached to the vehicular pillar 12. However, it is contemplated that the attachment mechanism(s) 66 can be configured to permit removal of the trim panel member 10 from connection with the associated pillar 12 by appropriate service technicians and the like for routine maintenance, service, and necessary access during the life of the vehicle. The attachment mechanisms 66 can be configured as suitable bore holes, engagement clips, and the like, as desired or required. Other configurations are also to be considered within the purview of this disclosure.

It is contemplated that the trim panel member 10 such as that disclosed herein, can be an element of a pillar assembly. For purposes of this discussion, a non-limiting embodiment of such an assembly is depicted in the FIG. 9 as reference numeral 100. Pillar assembly 100 can include a vehicular pillar structure such as pillar 12 shown in phantom that is configured to extend or can extend be between the vehicle roof 110 and body 112 of the associated vehicle body. As discussed previously, the trim panel member 10" will include an interior surface (not shown) and an opposed outer surface 48" and will cover at least a portion of the pillar 12 to define an airbag storage area 34 located between the interior surface (not shown) of the pillar trim panel member 10" and an outwardly facing surface of the pillar structure 12. The motor vehicle pillar assembly 100 also includes an inflatable side curtain airbag 36" that is coupled to the pillar structure 12 and is at least partially disposed in the airbag storage area 34 defined by the pillar structure 12 and pillar trim panel member 10".

It is contemplated that the pillar trim panel member 10" of pillar assembly 100 is a unitary molded member that includes at least two body portions. The pillar trim panel member 10" has a first body portion 16" configured to define a region of the airbag storage and to secure the pillar trim panel member 10 to the pillar structure 12. The pillar trim panel member 10 also includes a second body portion 18" deformable relative to the first body portion 16". The second deformable body portion 18" defines the remaining region of the airbag storage area 34 and is configured to selectively deform relative to the first body portion 16" in response to deployment of the side-curtain airbag 36".

The pillar trim panel member 10" of the pillar assembly 100 is at least partially defined by an upper edge 20", a lower edge 22", a leading side edge (not depicted), and a trailing side edge 26" with the first body portion 18" extending from the upper edge 20" to the lower edge 22" while the second body portion 18" is at least positioned proximate to the upper edge 20" of the trim panel member 10" and defining at least a portion of the trailing side edge. In the motor vehicle pillar assembly 100 as disclosed herein, the trailing side edge 26" of the trim panel 10" is positioned to be proximate to a suitable vehicular side window such as window 114.

It is contemplated in the embodiments as disclosed herein that the side-curtain airbag 36, 36" can include suitable components necessary to permit deployment of the airbag in the event of a crash. It is contemplated that the side-curtain airbag 36, 36" can include at least one expandable member such as expandable member 56 and at least one attachment device such as tether 58 (depicted in FIGS. 4, 5, and 6). The attachment device is positioned on the expandable member 56 at a first location and connects the airbag 36 to the pillar structure 12 in an essentially permanent manner. The expandable portion 56 of airbag 36 further comprises at least one tether 58 (depicted in FIG. 6). The tether 58 has a first end and a second end with the first end connected at a second position on the expandable portion 56 and the second end of the tether 58 connected to the pillar 12. When the airbag 36 is in the stowed position, the tether 58 can be contained in the airbag storage area such as storage area 34 defined by the trim panel member 10, 10" and the pillar structure 12.

Also contemplated within this disclosure is an automotive vehicle subassembly attachable to a vehicular pillar structure. The automotive vehicle subassembly can include pillar trim member 10 as described previously connected with a suitable roof assembly. It is contemplated that the roof assembly can include a roof side rail that is attached or attachable to the vehicular pillar structure and a side-curtain airbag storage chamber configured to contain at least a portion of a side-curtain airbag. The pillar trim member is in contact with the roof assembly and is configured to cover at least a portion of the vehicular pillar structure to define an airbag storage area between the pillar trim member and the vehicular pillar structure when the subassembly is in the use position. The device also includes an inflatable side-curtain airbag coupled to the pillar structure and at least partially disposed in the airbag storage area defined by the pillar structure and partially disposed in the roof assembly.

While the invention has been described in connection with what is presently considered to be the most practical and preferred embodiments, it is to be understood that the invention is not limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A trim panel selectively attached to a structural pillar of an automotive vehicle for use in covering an expandable side curtain air bag, the trim panel comprising:

a unitary molded body having an inner surface configured to face the stuctural pillar and an opposed outer surface, the unitary molded body also having an upper edge, a lower edge, leading side edge and a trailing side edge, the unitary molded body having a first body portion and a second body portion connected to the first body portion at a connection area, wherein the first body portion extends from the upper edge to the lower edge of the unitary molded body and wherein the second body portion is positioned proximate to the upper edge of the unitary molded body and defines at least a portion of the trailing side edge of the unitary molded body;

wherein the first body portion is formed of a first polymeric material having a first modulus of elasticity and the second body portion is formed of a second polymeric material having a second modulus of elasticity greater than the first modulus of elasticity, wherein the distal edge of the second body portion is operably deformable between a first position in overlying relationship with the side curtain airbag in a non-deployed state and a second deflected position upon deployment of the side curtain airbag.

2. The trim panel of claim 1 wherein the second body portion extends to the lower edge of the unitary molded body and wherein the unitary molded body has at least one arcuate surface located a position between the leading side edge and the trailing side edge and wherein the connection area between the first body portion and the second body portion located at a position on the arcuate surface.

3. The trim panel of claim 1 wherein the trailing side edge of the unitary molded body is configured to be positioned proximate to an associated vehicle window.

4. The trim panel of claim 1 wherein the polymeric material in the second body portion flexibly deforms in a sequentially unitary manner upon airbag deployment to facilitate movement of the airbag to a deployed condition.

5. The trim panel of claim 1 wherein the first and second body portions define a side-curtain airbag storage chamber when the trim panel is attached to the associated structural pillar.

6. The trim panel of claim 5 wherein the first body portion substantially defines the side curtain airbag storage chamber.

7. The trim panel of claim 1 wherein an upper end of the second body portion is selectively deformable in response to deployment of the airbag to facilitate transition of the side curtain airbag to a deployed configuration.

8. The trim panel of claim 7 wherein the second body portion is configured to flexibly deform from an initial point located proximate to the upper edge of the trim panel.

9. The trim panel of claim 1 wherein the connection between the first body portion and the second body portion is formed by a two-shot molding procedure.

10. The trim panel of claim 1 wherein the connection between the first body portion and the second body portion is at least one of a butt joint connection, an overlapping butt joint connection, and a lap joint connection.

11. The trim panel of claim 10 wherein the connection between the first body portion and the second body portion further comprises at least one connection reinforcement member contiguously projecting from one body portion into contact with the other body portion at a location proximate to the connection.

12. The trim panel of claim 11 wherein at least one connection reinforcement member projecting contiguously from the first body portion into contact with the second body portion is frangible upon deformation of the second body portion.

13. The trim panel of claim 1 further comprising at least one cover layer overlaying the outer surface of the unitary molded body, the layer containing at least one of a polymeric sheet and a woven sheet.

14. The trim panel of claim 13 wherein the cover layer is composed of the second polymeric material.

15. The trim panel of claim 1 further comprising at least one reinforcement member extending from the inner surface of the unitary molded body.

16. The trim panel of claim 15 wherein the reinforcement member is positioned on the first body portion.

17. The trim panel of claim 1 further comprising a side curtain airbag deflector connected to the inner surface of the unitary molded body, the side curtain airbag deflector projecting outward from the first body portion and defining an airbag deflector at an orientation sufficient to direct the airbag during deployment.

18. A trim panel selectively attachable to a structural vehicular pillar for use in concealing an expandable air bag, the trim panel comprising:

a first body portion composed of a first material having a first modulus of elasticity;

a second body portion connected to the first body portion at a connection area, the second body portion composed of a second material, wherein the second material is a moldable polymer having a second modulus of elasticity greater than the first modulus of elasticity, the first body portion and the second body portion cooperatively defining a side-curtain airbag storage chamber configured to conceal at least a portion of an expandable side-curtain airbag in a stowed orientation, wherein a distal region of the second body portion is operably deformable relative to the first body portion in response to deployment of the side-curtain airbag to define a flexible airbag deployment flap, the first body portion substantially defining the airbag storage chamber.

19. The trim panel of claim 18 wherein the trim panel is at least partially defined by an upper edge, a lower edge, leading side edge and a trailing side edge configured to contact the motor vehicle proximate to an associated vehicle window, wherein the first body portion extends from the upper edge to the lower edge and defines the leading side edge, and wherein the second body portion is positioned proximate to the upper edge of the trim panel and defines at least a portion of the trailing side edge.

20. The trim panel of claim 19 wherein the second body portion extends to the lower edge of the trim panel.

21. The trim panel of claim 18 wherein the second body portion is configured to flexibly deform from an initial point located proximate to the upper edge of the trim panel.

22. The trim panel of claim 18 wherein at least a portion of the connection area between the first body portion and the second body portion is formed by a two-shot molding process and wherein the connection area between the first body portion and the second body portion is at least one of a butt joint connection, an overlapping butt joint connection and an lap joint connection.

23. The trim panel of claim 22 wherein the connection area between the first body portion and the second body portion further comprises a least one connection reinforcement section contiguously projecting from one body portion into the body portion proximate thereto.

24. The trim panel of claim 23 wherein the connection reinforcement projects contiguously from the first body portion into contact with the second body portion and is configured to be frangible upon deformation of the second body portion.

25. The trim panel of claim 18 further comprising at least one layer in overlying relationship with an outer surface of the trim panel, the layer being at least one of a polymeric sheet and a fabric sheet.

26. The trim panel of claim 18 further comprising at least one frangible connection reinforcement integrally molded in the first body portion and overlying a portion of the polymeric material of the second body portion, the frangible connection reinforcement configured to fracture upon deployment of the airbag.

27. The trim panel of claim 18 further comprising at least one structural reinforcement member, the structural reinforcement member in contact with an inner surface of the first body portion.

28. The trim panel of claim 18 further comprising an airbag deflector, the airbag deflector connected to an inner surface of the first body portion and projecting angularly outward therefrom at an orientation sufficient to direct the airbag during deployment.

29. The trim panel of claim 18 further comprising at least one attachment mechanism projecting from the inner surface of the first body portion, the attachment mechanism configured to connectably engage a region of an associated pillar structure of an automotive vehicle.

30. A pillar assembly for a motor vehicle having a roof region and a body, the motor vehicle pillar assembly comprising:
a pillar structure extending between the vehicle body region and the vehicle roof region;
a pillar trim panel member coupled to the pillar structure, the pillar trim panel member having an inner surface and an opposed outer surface, the pillar trim member covering a portion of the pillar structure to define an airbag storage area between the inner surface of the pillar trim member and an outwardly facing surface of the pillar structure, the pillar trim panel member at least partially defined by an upper edge, a lower edge, leading side edge and a trailing side edge, the trailing side edge configured to be proximate to a vehicular side window; and
an inflatable side-curtain airbag coupled to the pillar structure and at least partially disposed in the airbag storage area defined by the pillar trim member and the pillar structure;
wherein the pillar trim panel member is a unitary molded member including a first body portion configured to substantially define the airbag storage area, the first body portion adapted to secure the pillar trim panel member to the pillar structure, and a second body portion connected to the first body portion at a connection area and deformable relative to the first body portion, the second deformable body portion defining a remaining portion of the airbag storage area, the second body portion configured to selectively deform relative to the first body portion in response to deployment of the airbag.

31. The motor vehicle pillar assembly of claim 30 wherein the first body portion is composed of a first material having a first modulus of elasticity and wherein the second deformable body portion is composed of a second material having a second modulus of elasticity, the second modulus of elasticity greater than the first.

32. The motor vehicle pillar assembly of claim 30 wherein the inflatable side-curtain airbag comprises at least one attachment mechanism located on the airbag at a first position connecting the airbag to at least one of the roof region and the pillar structure, the inflatable side-curtain airbag further comprising at least one tether, the tether having a first end connected to the airbag and a second end connected to the pillar structure.

33. The motor vehicle pillar assembly of claim 32 wherein the tether is contained in the airbag storage area defined between the trim panel member and the pillar structure.

34. The motor vehicle pillar assembly of claim 33 wherein the pillar trim member further comprises at least one reinforcement member, the reinforcement member in contact with the inner surface of the first body portion and extending from the inner surface to the pillar structure.

35. The motor vehicle pillar assembly of claim 31 wherein the pillar trim member further comprises an airbag deflector, the airbag deflector connected to the inner surface of the first body portion and projecting angularly outward therefrom at an orientation sufficient to direct the airbag during deployment.

36. The motor vehicle panel assembly of claim 34 wherein the connection area between the first region and the second deformable region of the pillar trim member is formed by a dual shot injection molding process.

37. The motor vehicle panel assembly of claim 36 wherein the first region and the second region of the trim panel member are connected to one another through at least one of a butt joint connection, an overlapping butt joint connection and a lap joint connection.

38. The motor vehicle panel assembly of claim 31 wherein the connection area between the first region and the second deformable region further comprises at least one projection contiguously extending from one respective region into the region proximate thereto.

39. The motor vehicle panel assembly of claim 31 wherein the trim panel member further comprises at least one frangible projection integrally molded in the first body portion and overlying a portion of the polymeric material of the second deformable body portion, the frangible projection configured to fracture upon deployment of the airbag.

40. The motor vehicle pillar assembly of claim 30, wherein the inflatable side curtain airbag engages the inner surface of the pillar trim member during deployment of the airbag to cause deformation of the second body portion of the pillar trim panel member with respect to the first body portion of the pillar trim panel member.

41. The motor vehicle pillar assembly of claim 30, wherein deformation of the second body portion of the pillar trim panel member with respect to the first body portion of the pillar trim panel member during deployment of the airbag defines a flexible airbag deployment flap.

42. The motor vehicle pillar assembly of claim 30, wherein the first body portion is composed of a first material and the second body portion is composed of a second material that is different than the first material.

* * * * *